United States Patent [19]
Dixon

[11] Patent Number: 5,276,704
[45] Date of Patent: Jan. 4, 1994

[54] SAWC PHASE DETECTION METHOD AND APPARATUS

[75] Inventor: Robert C. Dixon, Palmer Lake, Colo.

[73] Assignee: Omnipoint Data Company, Inc., Colorado Springs, Colo.

[21] Appl. No.: 971,689

[22] Filed: Nov. 4, 1992

Related U.S. Application Data

[63] Continuation of Ser. No. 556,147, Jul. 23, 1990, abandoned.

[51] Int. Cl.⁵ .................... H04L 27/30; H04K 1/00
[52] U.S. Cl. .................................................... 375/1
[58] Field of Search ................ 375/1, 23; 380/34; 455/27, 33; 370/85, 95, 96

[56] References Cited

U.S. PATENT DOCUMENTS

| | | |
|---|---|---|
| 27,738 | 8/1873 | Honma et al. . |
| 3,934,203 | 1/1976 | Schiff ........................ 375/1 |
| 3,978,436 | 8/1976 | Alig et al. . |
| 4,021,898 | 5/1977 | Willis et al. . |
| 4,051,448 | 9/1977 | Coussot . |
| 4,100,498 | 7/1978 | Aksup et al. ...................... 328/14 |
| 4,131,484 | 12/1978 | Caruso et al. . |
| 4,163,944 | 8/1979 | Chambers et al. . |
| 4,164,628 | 8/1979 | Ward et al. ........................ 375/1 |
| 4,217,563 | 8/1980 | Vale . |
| 4,222,115 | 9/1980 | Cooper et al. ..................... 375/1 |
| 4,247,942 | 1/1981 | Hauer .............................. 375/25 |
| 4,314,393 | 2/1982 | Wakatsuki et al. . |
| 4,355,411 | 10/1982 | Reudink et al. ................... 455/33 |
| 4,418,393 | 11/1983 | Zscheile ....................... 364/724.11 |
| 4,418,425 | 11/1983 | Fennel, Jr. et al. ............... 455/27 |
| 4,432,089 | 2/1984 | Wurzburg et al. . |
| 4,445,256 | 5/1984 | Huguenin et al. . |
| 4,455,651 | 6/1984 | Baran ............................... 375/1 |
| 4,456,793 | 6/1984 | Baker et al. . |
| 4,484,028 | 11/1984 | Kelly et al. . |
| 4,517,679 | 5/1985 | Clark et al. ....................... 375/37 |
| 4,525,835 | 6/1985 | Vance et al. . |
| 4,550,414 | 10/1985 | Guinon et al. ..................... 375/1 |
| 4,561,089 | 12/1985 | Rouse et al. ....................... 375/1 |
| 4,562,370 | 12/1985 | Von Dach . |
| 4,563,774 | 1/1986 | Gloge ............................... 375/1 |
| 4,567,588 | 1/1986 | Jerrim ............................. 375/1 |
| 4,569,062 | 2/1986 | Dellande et al. . |
| 4,601,047 | 7/1986 | Horwitz et al. ................... 375/1 |
| 4,606,039 | 8/1986 | Nicolas et al. ..................... 375/1 |
| 4,612,637 | 9/1986 | Davis et al. ...................... 370/95 |
| 4,621,365 | 11/1986 | Chiu ................................ 375/1 |
| 4,641,317 | 2/1987 | Fullerton ......................... 375/1 |
| 4,642,505 | 2/1987 | Arvanitis . |
| 4,647,863 | 3/1987 | Skudera et al. ................. 329/304 |
| 4,649,549 | 3/1987 | Halpern et al. .................. 380/32 |
| 4,653,069 | 3/1987 | Roder ............................. 375/1 |
| 4,660,164 | 4/1987 | Leibowitz . |
| 4,662,854 | 5/1987 | Lock et al. . |

(List continued on next page.)

OTHER PUBLICATIONS

Robert C. Dixon, *Spread Spectrum Systems*, (John Wiley & Sons, Inc., 1984; p. 256, FIG. 6.31).

J. H. Collins & P. M. Grant, *The Role of Surface Acoustic Wave Technology in Communication Systems*, Ultrasonics, vol. 10, No. 2, Mar. 1972, pp. 59–71.

P. J. Hagon et al., *A Programmable Surface Acoustic Wave Matched Filter for Phase-Coded Spread Spectrum Waveforms*, IEEE Transactions on Microwave Theory and Techniques, vol. 21, No. 4, Apr. 1973, New York, pp. 303–306.

(List continued on next page.)

*Primary Examiner*—Salvatore Cangialosi
*Attorney, Agent, or Firm*—Lyon & Lyon

[57] ABSTRACT

A phase coded surface-acoustic-wave-correlator device used with a spread spectrum receiver. The spread spectrum receiver receives a spread spectrum signal which has a carrier signal with a phase modulated by a data-bit sequence and by a chip sequence. The chip sequence is repetitively and coherently generated with each bit of the data-bit sequence and is modulated with one period of the chip sequence. The surface-acoustic-wave-correlator device is phase matched to the chip sequence. The surface-acoustic-wave-correlator device outputs a post-SAWC-signal pulse having the carrier signal phase modulated by the data-bit sequence. A phase detector detects the phase of the carrier signal and generates the data-bit sequence.

19 Claims, 2 Drawing Sheets

U.S. PATENT DOCUMENTS

| | | | |
|---|---|---|---|
| 4,672,254 | 6/1987 | Dolat et al. | |
| 4,672,658 | 6/1987 | Kavehrad et al. | 375/1 |
| 4,680,785 | 7/1987 | Akiyama et al. | |
| 4,691,326 | 9/1987 | Tsuchiya | 375/1 |
| 4,701,904 | 10/1987 | Darcie | |
| 4,703,474 | 10/1987 | Foschini et al. | 375/1 |
| 4,707,839 | 11/1987 | Andren et al. | 375/1 |
| 4,718,080 | 1/1988 | Serrano | |
| 4,724,435 | 2/1988 | Moses et al. | 375/1 |
| 4,742,512 | 5/1988 | Akashi et al. | 370/96 |
| 4,745,378 | 5/1988 | Niitsuma et al. | |
| 4,754,453 | 6/1988 | Eizenhofer | 370/95 |
| 4,754,473 | 6/1988 | Edwards | |
| 4,759,034 | 7/1988 | Nagazumi | 375/1 |
| 4,759,078 | 7/1988 | Schiller | |
| 4,769,812 | 9/1988 | Shimuzu | |
| 4,787,093 | 11/1988 | Rorden | 375/23 |
| 4,800,885 | 1/1989 | Johnson | 128/633 |
| 4,804,938 | 2/1989 | Rouse et al. | 340/310 A |
| 4,805,208 | 2/1989 | Schwartz | |
| 4,807,222 | 2/1989 | Amitay | |
| 4,813,057 | 3/1989 | Fullerton | 375/37 |
| 4,815,106 | 3/1989 | Propp et al. | |
| 4,833,702 | 5/1989 | Shitara et al. | |
| 4,837,786 | 6/1989 | Gurantz et al. | 370/20 |
| 4,837,802 | 6/1989 | Higashiyama et al. | |
| 4,860,307 | 8/1989 | Nakuyama | 375/1 |
| 4,866,732 | 9/1989 | Carey et al. | 375/1 |
| 4,878,238 | 10/1989 | Rash et al. | 375/1 |
| 4,893,327 | 1/1990 | Stern et al. | 455/33 |
| 4,894,842 | 1/1990 | Broekhoven et al. | 375/1 |
| 4,901,307 | 2/1990 | Gilhousen et al. | 375/1 |
| 4,905,221 | 2/1990 | Ichiyoshi | 375/1 |
| 4,918,689 | 4/1990 | Hui | 370/85 |
| 4,943,973 | 7/1990 | Werner | 375/1 |
| 4,965,759 | 10/1990 | Uchida et al. | 364/604 |
| 4,979,186 | 12/1990 | Fullerton | 375/23 |
| 4,984,247 | 1/1991 | Kaufmann et al. | 375/1 |
| 4,995,083 | 2/1991 | Baker et al. | 455/33 |
| 5,005,183 | 4/1991 | Carey et al. | 375/1 |
| 5,008,953 | 4/1991 | Dahlin et al. | 455/33 |
| 5,016,255 | 5/1991 | Dixon et al. | 375/1 |
| 5,018,165 | 5/1991 | Sohner et al. | 375/1 |
| 5,022,047 | 6/1991 | Dixon et al. | 375/1 |
| 5,023,887 | 6/1991 | Takeuchi et al. | 375/1 |
| 5,025,452 | 6/1991 | Sohney et al. | 375/1 |
| 5,042,050 | 8/1991 | Owen | 375/1 |
| 5,056,109 | 10/1991 | Gilhousen et al. | 375/1 |
| 5,073,900 | 12/1991 | Mallinckrodt | 375/1 |
| 5,081,642 | 1/1992 | O'Clock, Jr. et al. | 375/1 |
| 5,101,501 | 3/1992 | Gilhousen et al. | 375/1 |
| 5,109,390 | 4/1992 | Gilhousen et al. | 375/1 |

OTHER PUBLICATIONS

Robert C. Dixon, *Spread Spectrum Systems*, John Wiley & Sons, Inc., 1985; pp. 24–86, 206.

Applications of Spread Spectrum Radio to Indoor Data Communications, Ralph Eschenbach, Hewlett-Packard Laboratories, 1982, IEEE, 34.5-1/5-3.

Applications of Spread-Spectrum Radio to Wireless Terminal Communications, Fretet et al., Hewlett-Packard Laboratories, 1980 IEEE, 69.7.1/.

Wireless Terminal Communications Using Spread Spectrum Radio, Freret, Hewlett-Packard Laboratories, 1980 IEEE, pp. 244 to 247.

Direct-Sequence Spread Spectrum With DPSK Modulation & Diversity For Indoor Wireless Communications, Kavehrad et al., 1987 IEEE Transactions on Communications, vol. Com-35, No. 2, Feb.

Performance of Low-Complexity Channel Coding & Diversity for Spread Spectrum in Indoor, Wireless Communication, Kavehrad et al., AT&T Technical Journal, vol. 64, No. 8, Oct. 1985, Printed in U.S.A.

Spread Spectrum for Indoor Digital Radio, Kavehrad et al., IEEE Communications Magazine, Jun. 1987, vol. 25, No. 5, pp. 32–40.

*Spread Spectrum Systems*, by Robert Dixon, pp. 230–232; (Wiley & Sons, 1984).

SAWC PHASE DETECTION METHOD AND APPARATUS

This is a continuation of co-pending application Ser. No. 7/556,147, filed on Jul. 23, 1990 and which designated the U.S., now abandoned.

BACKGROUND OF THE INVENTION

This invention relates to spread spectrum communications, and more particularly to a spread spectrum receiver that utilizes a phase coded surface-acoustic-wave device or other analog device.

DESCRIPTION OF THE PRIOR ART

A spread spectrum system is one in which the signal energy is distributed over a frequency spectrum that is much wider than the maximum bandwidth required to transmit the information being sent. Techniques for direct sequence spread spectrum modulation have been developed for several years to promote among other benefits, secure communications. Modulation is achieved by mixing (or multiplying) the information to be sent with a periodic pseudo-noise (PN) code. The spectral density function for the resulting signal has a $\sin(X)/X$ shape with a very wide bandwidth, as compared to the information, and a lower spectral density function amplitude as compared to the information. This modification of the original spectral density function reduces the signal's sensitivity to in-band interference and jamming, as well as reducing interference to other equipment that is sensitive to radio frequencies. Among the other advantages inherent to a spread spectrum system are selective addressing capabilities, code division multiplexing for multiple access, and highly accurate ranging capabilities.

Due to the encoded nature of the signal, demodulation is a more involved process compared with demodulation schemes associated with traditional communications systems. In this case, demodulation involves a receiver reference code, identical to that transmitted, that synchronizes the receiver with the transmitter. The difficulty with this process is that there is no indication of the degree of non-synchronization between received and reference codes until a very high degree of synchronization is achieved. Additionally, mismatches between transmit and receive oscillators used to generate PN codes tend to cause drift in the synchronization between transmitter and receiver.

A prior art communications system using two pseudo-random waveforms and two correlators for designating a MARK and a SPACE, is disclosed in U.S. Pat. No. 4,247,942, to Hauer, issued Jan. 27, 1981, which is incorporated herein by reference. Hauer discloses in a communication system, a first delay line having multiple spaced taps for supplying successive input pulses to the delay line. In response to each input impulse, variously delayed pulses appear at the taps of the delay line, which are used to generate pulses representing a MARK or a SPACE. His disclosure includes synchronous detectors, and means for supplying the carrier-transmitted pulses to the detectors.

The prior art does not teach or suggest an apparatus having or using a single tapped delay line surface-acoustic-wave-correlator (SAWC) device for decoding either of two spread spectrum chip sequences or N tapped delay line SAWCs for decoding a multiple of N spread spectrum chip sequences.

OBJECTS AND SUMMARY OF THE INVENTION

An object of the invention is to provide an apparatus for demodulating, using SAWCs, a spread spectrum signal which uses different codes for different information symbols.

Another object of the invention is to provide an apparatus for acquiring a spread spectrum signal without the requirement of a separate synchronous reference code.

An additional object of the invention is to provide an apparatus which will acquire a spread spectrum signal on each data bit received at the rate the data are transmitted with no time loss due to code synchronization, and without use of any code synchronization preambles.

Another object of the invention is to demodulate a first data symbol represented by a first phase shift on a carrier signal and having a spread spectrum chip sequence modulating the first phase-shift on the carrier signal, and a second data symbol represented by a second phase shift on the carrier signal and having the spread spectrum chip sequence modulating the second phase shift on the carrier signal, using a SAWC appropriately tapped for the spread spectrum chip sequence and a phase detection device.

A still further object of the invention is to demodulate a plurality of data symbols represented by a plurality of phase shifts on a carrier signal and having a spread spectrum chip sequence modulating the plurality of phase shifts on the carrier signal, respectively, using a SAWC appropriately tapped for the spread spectrum chip sequence and a phase detection device.

According to the present invention, as embodied and broadly described herein, a phase coded surface acoustic wave correlator (SAWC) based spread spectrum receiver for use on a spread spectrum signal employing a phase-shift modulated carrier signal is provided comprising a SAWC and a phase detector. The SAWC has appropriate transducer and tapped delay line structures phased-matched to a chip sequence of the phase-shift modulated carrier signal, at the carrier signal frequency or an equivalent frequency, such as an intermediate frequency (IF). The carrier signal of the spread spectrum signal is phase modulated by a data-symbol sequence. The data-symbol sequence is coherently modulated by a repetitively generated chip sequence. The repetitively generated chip sequence is known as the spreading sequence for generating the spread spectrum signal. The data-symbol sequence usually includes information to be communicated by the spread spectrum signal. Preferably, each data symbol is modulated by a complete sequence of the repetitively generated chip sequence.

In response to a spread spectrum signal having a carrier signal which is phase modulated by a chip sequence matched to the tapped-delay line structures of the SAWC, the SAWC outputs a post-SAWC-signal pulse at the carrier signal frequency or the equivalent frequency. The post-SAWC-signal pulse has a data phase which corresponds to the data symbol of the data-symbol sequence which modulated the carrier signal. The post-SAWC-signal pulse has a signal-to-noise enhancement, which is also known as processing gain, that is a function of the number of chips in one complete chip sequence.

Additional objects and advantages of the invention will be set forth in part in the description which follows, and in part will be obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS AND PHOTOGRAPHS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

The invention disclosed in this patent is related to the inventions disclosed in U.S. patent application entitled "Spread Spectrum Correlator", by Robert C. Dixon and Jeffrey S. Vanderpool and having Ser. No. 07/390,315 and Filing Data of Aug. 7, 1989, and in U.S. patent application entitled "Asymmetric Spread Spectrum Correlator" by Robert C. Dixon and Jeffrey S. Vanderpool and having Ser. No. 07/389,914 and Filing Date of Aug. 7, 1989, which are expressly incorporated herein by reference.

Reference will now be made in detail to the present preferred embodiments of the invention, examples of which are illustrated in the accompanying drawings. As used herein, "SAWC" means surface acoustic wave correlator.

Figure 1:
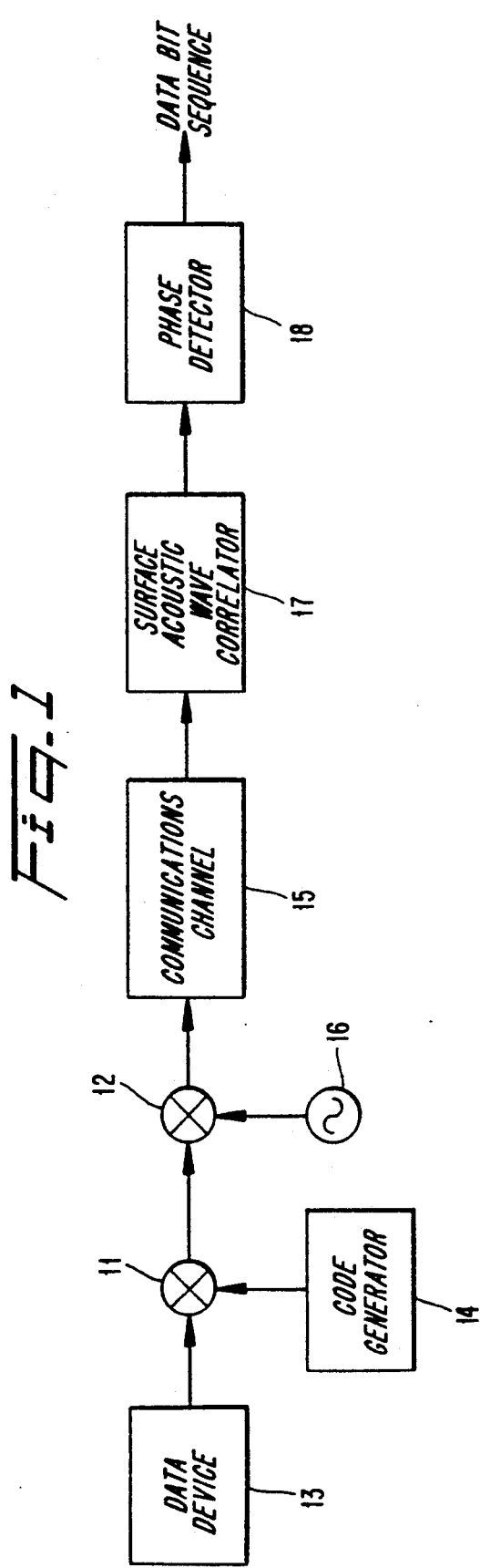
FIG. 1 illustrates one embodiment of a phase coded surface acoustic wave device spread spectrum receiver according to the present invention.

The present invention includes the use of a SAWC for demodulating a phase-coded spread spectrum signal. As illustrated in FIG. 1, a spread spectrum transmitter and receiver are shown including data-sequence-generating means, chip-sequence-generating means, chip-sequence-modulating means, carrier-modulating means, a SAWC device, and phase-detecting means. The data-sequence-generating means may be embodied as a data device 13 which outputs a data-symbol sequence. The data-symbol sequence usually includes information to be communicated by the spread spectrum signal. The data-symbol sequence may have each data symbol represent two or more data bits. In a binary case, the data-symbol sequence has each data symbol represent one data bit, and accordingly, the data-symbol sequence is known as a data-bit sequence. As an example, the data device 13 may be a computer terminal a device which has converted analog voice or video to data, or any other source where data are to be transmitted form a transmitter to a receiver.

The chip-sequence-generating means may be embodied as a code generator 14 which repetitively generates a chip sequence. The repetitively generated chip sequence is known as the spreading sequence for generating the spread spectrum signal. In a preferred embodiment, the chip sequence is a pseudo-noise (PN) code. The code generator 14 may employ shift registers having appropriate taps for generating the chip sequence. The chip sequence is generated coherently with each data symbol, generated by the data device 13.

The chip-sequence-modulating means may be embodied as a chip-modulating device 11. Preferably, each data symbol is modulated by a complete sequence of the repetitively generated chip sequence. For a binary case where the data-symbol sequence is embodied as a data-bit sequence having 1-bits and 0-bits, the chip-modulating device 11 can be realized with a modulo-2 adder, or an exclusive-OR gate. Accordingly, the chip-modulating device 11 outputs the chip sequence from code generator 14 in response to a 0-bit from the data device 13, and an inverted, 180° phase shifted, chip sequence in response to a 1-bit from the data device 13.

A signal source 16 generates a carrier signal. The carrier-modulating means is coupled to the chip-sequence-modulating means and the signal source 16, and may be embodied as a phase modulator 12. The phase modulator 12 modulates the carrier with the output from the chip-modulating device 11, causing phase shifts in the carrier signal corresponding to each state transition of the chip sequence. The spread spectrum signal is the carrier signal, modulated with the output from the chip modulating device 11. Thus, the carrier signal of the spread spectrum signal is phase modulated by a repetitively generated chip sequence, which is coherently phase modulated by a data-symbol sequence. The phase modulator 12 outputs the spread spectrum signal to a communications channel 15.

Figure 2:
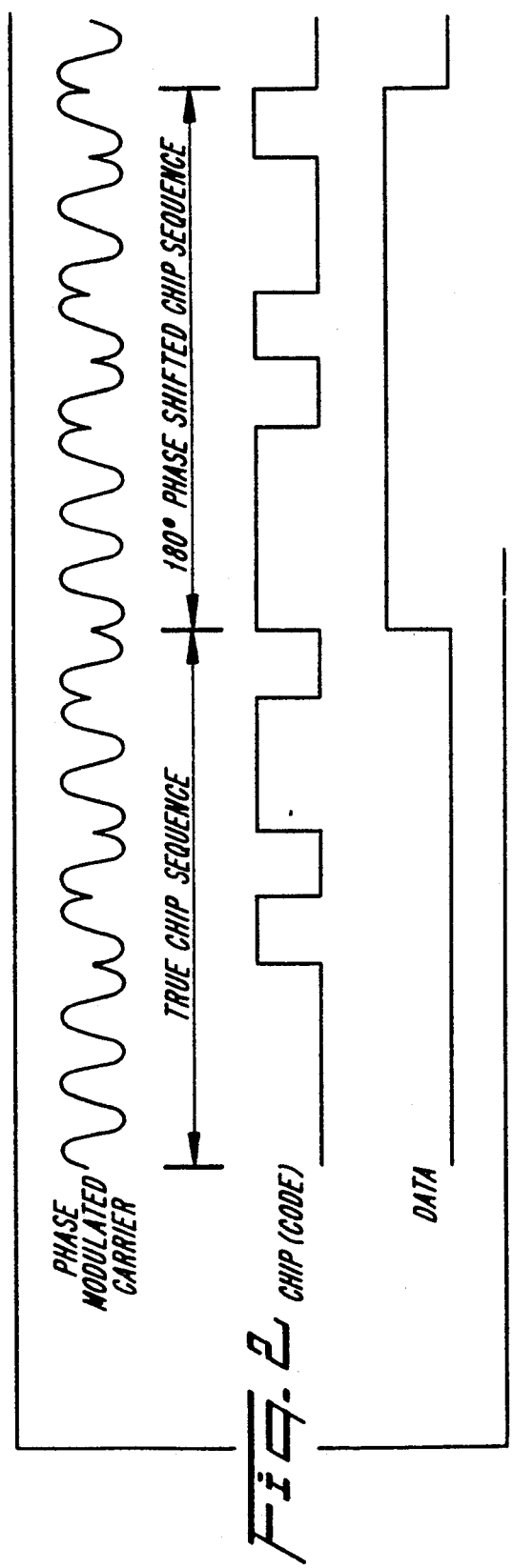
FIG. 2 shows modulo-2 addition for BPSK carrier signal modulation, for a data-bit sequence and an eight chip-code sequence.

By way of example, FIG. 2 illustrates the operation for BPSK carrier signal modulation and modulo-2 addition for a data-symbol sequence embodied as a data-bit sequence, and an eight chip code sequence. Shown are a code chip clock, chip sequence, data-bit sequence, carrier signal, and phase modulated carrier signal. The data-bit sequence forces a 180° code sequence phase shift for each change in the data-bit sequence. The chip sequence in turn causes a 180° carrier signal phase shift for each change in the chip sequence.

A phase coded surface acoustic wave correlator (SAWC) based spread spectrum receiver for demodulating the spread spectrum signal having the phase-shift-modulated carrier signal is provided comprising a SAWC 17 and phase-detecting means. The SAWC 17 has appropriate transducer and tapped delay line structures phased-matched to the chip sequence of the phase-shift modulated carrier signal, at the carrier signal frequency or an equivalent frequency, such as an intermediate frequency (IF).

A SAWC is a passive device designed to recognize a specific sequence of code chips and accomplishes this through a correlation of phase shifts in an RF signal. Each delay element within the SAWC device has a delay equal to the period of the clock of the transmitted chip code such that each element corresponds to only one chip at any one time. As the received signal propagates down the SAWC device, the phase structure of each element is added in or out of phase with the propagated received signal, and the outputs of all the elements from the SAWC are summed in phase to arrive at a total correlation value. When all the phase shift structures of the elements match the phase shifts of the received signal, then the maximum sum and correlation is achieved.

In order to achieve the desired correlation, the correct reference code must be "loaded" onto the SAWC device. The present discussion is for a BPSK device, however, the invention extends and includes any PSK process such as MSK, QPSK, etc. Assuming a binary-phase shift keyed signal, 180° phase shifts occur at each one/zero transition of the chip sequence. Receiver detection with a SAWC is usually accomplished in one of two ways. The first is through a programmable SAWC which allows programming all phases in each element by a user. The inverted and non-inverted phase element are summed. The second is through a non-programmable SAWC.

In non-programmable SAWCs, the phase shifts are programmed at the time of construction through transducers placed in each element to produce an elemental phase match. The non-programmable SAWCs cannot be changed by the user. Thus, only one chip sequence can be correlated. The inverted and non-inverted phase elements of the coded SAWC are then summed together just as in the programmable device.

A received signal, which is phase-shift-key modulated with a chip sequence at an RF frequency equivalent to that in the SAWC, is amplified and fed to the SAWC. The received signal may be down-converted, although down conversion to an IF frequency is not preferred unless necessary, before being fed to the SAWC. As the received signal propagates across the surface of the SAWC, the energy in each delay element increases by a factor determined by the phase of the reference elements versus the received signal phase. When the received signal propagates to the end of the delay line correlator, and all the phase shifts in the received signal match the phase shifts in the SAWC, a maximum correlation energy is attained. At this point, the SAWC outputs a post-SAWC-signal pulse.

The post-SAWC-signal pulse has a signal-to-noise enhancement, which is also known as processing gain, that is a function of the number of chips in one compete chip sequence. The post-SAWC-signal pulse typically is a two-chip-wide pulse which comprises the carrier signal modulated with the first phase or the second phase. Essentially, the post-SAWC-signal pulse is a very narrow pulse of the carrier signal phase modulated with the data bit sequence.

Referring to FIG. 1, in response to a spread spectrum signal having a phase-shifted modulated carrier signal which is phase modulated by a chip sequence matched to the tapped-delay line structures of the SAWC 17, the SAWC 17 outputs a post-SAWC-signal pulse at the carrier signal frequency or the equivalent frequency. The post-SAWC-signal pulse has a data phase which corresponds to the data symbol of the data-symbol sequence which modulated the carrier signal.

The phase detecting means may be embodied as a phase detector 18. The phase detector 18 is coupled to the surface-acoustic-wave correlator 17. The phase detector 18 detects the changes in phase in the post-SAWC-signal pulse outputted from the surface-acoustic-wave correlator 17. In response to detecting a particular phase, the phase detector 18 outputs a corresponding data-symbol.

The phase-detecting means may, for example, be embodied as a phase detector 18 which compares the phase of adjacent bits in the carrier signal outputted from the surface-acoustic-wave device 17. This modulation is commonly known as differential phase shift keying (DPSK).

Alternatively, the phase-detecting means may be embodied in other ways, such as a phase-locked-loop (PLL) device which is coupled to the surface-acoustic-wave device 17. The PLL device locks the phase and frequency of a PLL signal onto the post-SAWC-signal pulse. A phase comparator may be added to the output of the phase-locked-loop device for comparing the phase of the PLL signal with the phase of the post-SAWC-signal pulse and thereby generate the data symbol sequence.

An advantage of the present invention is the ability to detect multiple data symbols from a single chip sequence, phase modulated carrier signal by detecting the phase of a very narrow post-SAWC-signal pulse outputted from a SAWC. A transmitter can send, for example, a carrier signal having phase shifts representing a data-symbol sequence using only one chip code. For the binary case, the data symbols represented as data bits determine whether to send a first chip code or a phase shifted version of the first chip code. The present invention requires only a single tapped delay line SAWC for a matched filter, which is phase matched to the chip code. For the binary case, the carrier signal is binary phase shift key (BPSK) modulated with a chip sequence, and the phase of the carrier signal can be shifted 180° at every state transition of the chip sequence. For the binary case, the chip sequence is further phase modulated by a data-bit sequence whereby a first data-bit, i.e. a 1-bit, causes the chip sequence to be generated and a second data-bit, i.e. a 0-bit, causes a 180° phase shifted version of the chip sequence to be generated. Thus, the carrier signal is phase shifted 180° at every state transition of the chip sequence, and also phase shifted at every state transition of the first and second data bits.

Figure 3B:
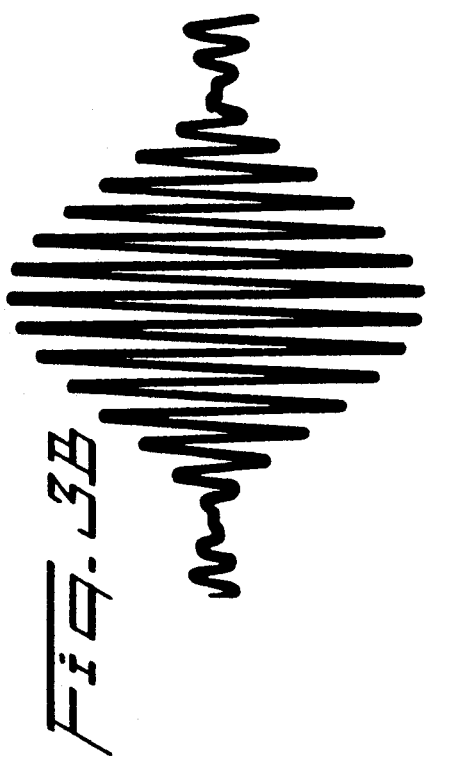
FIG. 3B illustrates a time-expanded view of the post-SAWC-signal pulse.
Figure 4B:
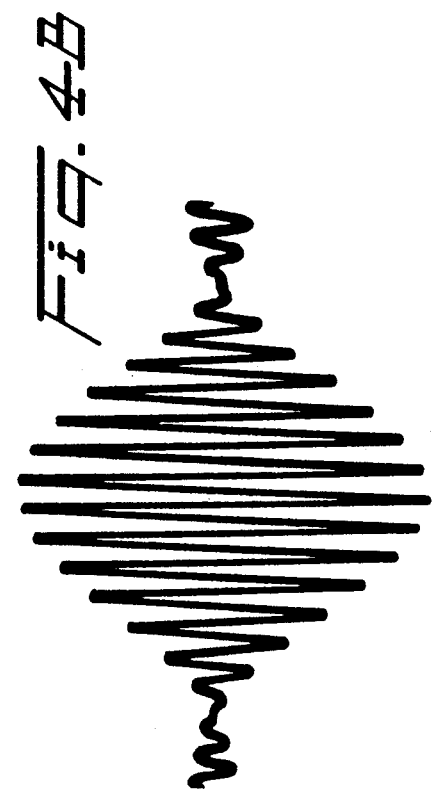
FIG. 4B is a time-expanded view of the phase inverted post-SAWC-signal pulse.
Figure 3A:
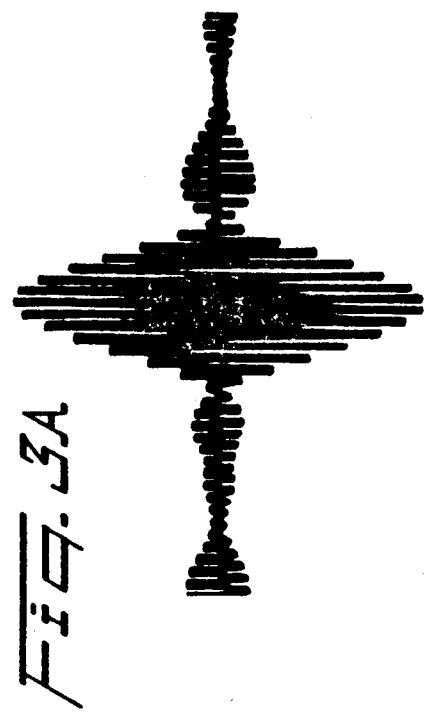
FIG. 3A illustrates a post-SAWC-signal pulse for an 80 nanosecond pulse.
Figure 4A:
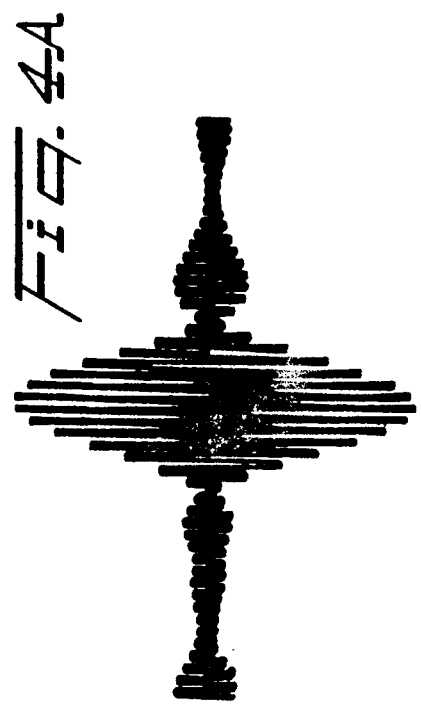
FIG. 4A illustrates a phase inverted version of the post-SAWC-signal pulse.

FIG. 3A illustrates a post-SAWC-signal pulse having a first phase for an 80 nanosecond pulse outputted from the surface-acoustic-wave correlator. FIG. 3B is a time expanded view of the post-SAWC-signal pulse. FIG. 4A illustrates a post-SAWC-signal pulse having a second phase where the second phase is a 180° phase shifted version of the first phase. FIG. 4B is a time-expanded view of the post-SAWC-signal pulse having the second phase.

The present invention may be extended to phase shift keyed systems other than binary. By way of example, in a QPSK system, a single quadrature phase tapped delay line SAWC would detect one of four phases by having a carrier signal modulated in 90° phase shifts by one or more chip sequences, as opposed to the two phases detected in the BPSK system by a bi-phase tapped delay line SAWC. In a QPSK system, each chip sequence would represent one of four data symbols, or two binary data bits.

The present invention may be extended to a M-ary system using the same underlying techniques as presented herein. For example, a quaternary BPSK system would utilize two chip codes to generate a first chip sequence and a second chip sequence, and a 180° phase shifted version of each chip sequence requiring only two tapped delay line SAWC's. In this case, two chip sequences may represent two of four data-symbols each, or two binary bits. Two data-symbols would be represented by the first chip sequence and a 180° phase shifted version of the first chip sequence, respectively. Two additional data-symbols would be represented by a second chip sequence and a 180° phase shifted version of the second chip sequence, respectively. Accordingly, a receiver would require only two bi-phase tapped delay line SAWC's to demodulate four symbols by phase comparing the post-SAWC-signal pulses. This concept may be extended to QPSK, etc.

This system may also be extended by using a single chip sequence to represent more than two chip sequence states. For example, in a BPSK system, the chip sequence may represent a first data symbol, a phase shifted version of the chip sequence may represent a second data symbol, a time reversed, or "reciprocal" version of the chip sequence may represent a third data symbol, and a reciprocal, phase shifted version of the chip sequence may represent a fourth data symbol.

More broadly, the present invention may include N phase coded SAWC devices in a spread spectrum receiver for use in spread spectrum signals including a carrier signal phase modulated by a data-symbol sequence and one of N chip sequences or phase shifted versions of the N chip sequences. The chip sequences repetitively and coherently are generated with the data-symbol sequence determining the generation of one of the N chip sequences or a phase shifted version of that chip sequence. A plurality of N SAWC's are employed with each SAWC matched to one of the N sequences. In response to the carrier signal modulated with one of the data-symbol sequences and chip sequences, the SAWC phase matched to the chip sequence transmitted outputs a post-SAWC-signal pulse whose phase is determined by the phase shift of the chip sequence. In response to the post-SAWC-signal pulse, the phase detection means, coupled to the SAWC output, detects the phase of the post-SAWC-signal pulse and generates a corresponding the data-symbol.

The present invention may be extended to M-ary and/or MSK, or QPSK symbols using the same underlying techniques as presented herein, where each phase shift generated by a data sequence may represent a data symbol or symbols. A single spread spectrum receiver may employ one or more SAWC's, and a single SAWC may employ more than one tapped delay line. A single SAWC device may have one or more correlators, and a system may have one or more SAWC's.

A difference between the method and apparatus of this invention and those used in the prior art is that the correlation pulse is used to directly derive the data symbols, while other systems may use the pulse for synchronizing a much longer reference code signal to the incoming received code signal.

A difference between SAWC devices and digital correlators is in the frequency bands in which they are used. The SAWC devices are usually employed at IF, but they can be used at RF. The digital correlators are usually used at baseband. Another difference is that SAWC devices perform phase shift comparisons while the digital correlators perform voltage level comparisons. Further, the SAWC devices sum the outputs differently from that of digital correlators. Also, when the present invention is realized with a SAWC correlator, no receive code clock is required to correlate the PN code. The present invention, using a SAWC correlator, may be realized using fewer components.

It will be apparent to those skilled in the art that various modifications can be made to the phase coded spread spectrum SAWC receiver for decoding a received spread spectrum signal, which includes a data signal modulated with a PN code, of the instant invention without departing from the scope or spirit of the invention, and it is intended that the present invention cover modifications and variations of the phase coded spread spectrum SAWC receiver provided they come within the scope of the appended claims and their equivalents.

I claim:

1. A SAWC apparatus comprising:
    data-sequence-generating means for generating a data-bit sequence having first data bits and second data bits;
    chip-sequence-generating means coupled to said data-sequence-generating means for repetitively generating coherently with the data-bit sequence a chip sequence;
    chip-sequence-modulating means coupled to said data-sequence-generating means and said chip-sequence-generating means, responsive to a first data bit for outputting the chip sequence, and responsive to a second data bit for phase shifting the chip sequence and outputting an phase shifted chip sequence;
    carrier-modulating means coupled to said chip-sequence-modulating means, and responsive to the chip sequence and phase shifted chip sequence, for modulating a phase of a carrier signal;
    a surface-acoustic-wave correlator phase matched to the chip sequence and responsive to the phase of the carrier signal for outputting a post-SAWC-signal pulse having the first data phase or second data phase; and
    phase-detecting means coupled to said surface-acoustic-wave correlator and responsive to the phase of the post-SAWC-signal pulse for generating the data-bit sequence.

2. A SAWC receiver for use on a spread spectrum signal having a carrier signal base modulated by a data-bit sequence and by a chip sequence, with the chip sequence being repetitively generated and coherently modulating each bit of the data-bit sequence with one period of the chip sequence, the improvement comprising:
    a surface-acoustic-wave correlator phase matched to the chip sequence and responsive to the phase of the carrier signal modulated with the data-bit sequence ad chip sequence, for outputting a post-SAWC-signal pulse having the phase determined by the data-bit sequence; and
    phase-detecting means coupled to said surface-acoustic-wave correlator and responsive to the phase of the post-SAWC-signal pulse for generating the data-bit sequence,
    wherein said phase-detecting generating means includes:
    means coupled to said surface-acoustic-wave-correlator device and responsive to comparing the phase of adjacent bits of the carrier signal for generating the data-bit sequence.

3. A SAWC receiver for use on a spread spectrum signal having a carrier signal phase modulated by a data-bit sequence and by a chip sequence, with the chip sequence being repetitively generated and coherently modulating each bit of the data-bit sequence with one period of the chip sequence, the improvement comprising:
    a surface-acoustic-wave correlator phase matched to the chip sequence and responsive to the phase of the carrier signal modulated with the data-bit sequence and chip sequence, for outputting a post-SAWC-signal pulse having the phase determined by the data-bit sequence; and phase-detecting means coupled to said surface-acoustic-wave correlator and responsive to the phase of the post-SAWC-signal pulse for generating the data-bit sequence, wherein said phase-detecting generating means includes:

a phase-locked-loop device coupled to said surface-acoustic-wave-correlator device and responsive to the post-SAWC-signal pulse for locking phase and frequency of a PLL signal onto the post-SAWC-signal pulse; and means coupled to said phase-locked-loop device for comparing the phase of the PLL signal with the phase of the post-SAWC-signal pulse and generating the data-bit sequence.

4. A phase coded spread spectrum SAWC system comprising:

data-sequence-generating means for generating a data-symbol sequence having a plurality of data symbols;

chip-sequence-generating means coupled to said data-sequence-generating means for repetitively generating a chip sequence;

carrier-modulating means coupled to said data-sequence-generating means and said chip-sequence-generating means, for modulating a phase of a carrier signal with each chip of the chip sequence and each data-symbol of the plurality of data symbols, respectively;

a surface-acoustic-wave correlator phase matched to the chip sequence and responsive to the phase of the carrier signal for outputting a post-SAWC-signal pulse having the phase corresponding to the data-symbol modulating the carrier signal, respectively; and phase-detecting means coupled to said surface-acoustic-wave correlator and responsive to the phase of the post-SAWC-signal pulse for generating the corresponding data symbol.

5. A SAWC receiver for use on a spread spectrum signal having a carrier signal phase modulated by a data-symbol sequence and by a chip sequence, with the chip sequence being repetitively generated and coherently modulating each symbol of the data-symbol sequence with one period of the chip sequence, the improvement comprising:

a surface-acoustic-wave correlator phase matched to the chip sequence and responsive to the phase of the carrier signal modulated with the data-symbol sequence and chip sequence, for outputting a post-SAWC-signal pulse having the phase corresponding to the data-symbol modulating the carrier signal; and phase-detecting means coupled to said surface-acoustic-wave correlator and responsive to the phase of the post-SAWC-signal pulse for generating the corresponding data symbol, wherein said phase-detecting generating means includes:

means coupled to said surface-acoustic-wave-correlator device and responsive to comparing the phase of adjacent symbols of the carrier signal for generating the corresponding data symbol.

6. A SAWC receiver for use on a spread spectrum signal having a carrier signal phase modulated by a data-symbol sequence and by a chip sequence, with the chip sequence being repetitively generated and coherently modulating each symbol of the data-symbol sequence with one period of the chip sequence, the improvement comprising:

a surface-acoustic-wave correlator phase matched to the chip sequence and responsive to the phase of the carrier signal modulated with the data-symbol sequence and chip sequence, for outputting a post-SAWC-signal pulse having the phase corresponding to the data-symbol modulating the carrier signal; and phase-detecting means coupled to said surface-acoustic-wave correlator and responsive to the phase of the post-SAWC-signal pulse for generating the corresponding data symbol, wherein said phase-detecting generating means includes:

a phase-locked-lop device coupled to said surface-acoustic-wave-correlator device and responsive to the post-SAWC-signal pulse for locking phase and frequency of a PLL signal onto the post-SAWC-signal pulse; and means coupled to said phase-locked-loop device for comparing the phase of the PLL signal with the phase of the post-SAWC-signal pulse and generating the corresponding data symbol.

7. A phase coded spread spectrum SAWC system comprising:

data-sequence-generating means for generating a data-symbol sequence;

chip-sequence-generating means for repetitively generating a chip sequence;

chip-sequence-modulating means responsive to a first data symbol for outputting the chip sequence, and responsive to a second data symbol for phase shifting the chip sequence and outputting a phase shifted chip sequence;

carrier-modulating means responsive to the chip sequence and phase shifted chip sequence, for modulating a carrier signal;

a surface-acoustic-wave correlator phase matched to the chip sequence and responsive to the phase of the carrier signal for outputting a post-SAWC-signal pulse having a first phase or a second phase corresponding the chip sequence or phase shifted chip sequence, respectively; and phase-detecting means responsive to the phase of the post-SAWC-signal pulse for generating the data-symbol sequence.

8. A SAWC receiver for use on a spread spectrum signal having a carrier signal phase modulated by a data-symbol sequence and by at least a first chip sequence, with the chip sequence being repetitively generated and coherently modulating each symbol of the data-symbol sequence with one period of the chip sequence, the improvement comprising:

at least one surface-acoustic-wave correlator phase matched to the chip sequence and responsive to the phase of the carrier signal modulated with the data-symbol sequence and chip sequence, for outputting a post-SAWC-signal pulse having the phase corresponding to the data-symbol sequence; ad phase-detecting means responsive to the phase of the post-SAWC-signal pulse for generating the data symbol, wherein said phase-detecting generating means includes:

means coupled to said surface-acoustic-wave-correlator device and responsive to comparing the phase of adjacent symbols of the carrier signal for generating the data symbol.

9. A SAWC receiver for use on a spread spectrum signal having a carrier signal phase modulated by a data-symbol sequence and by at least a first chip sequence, with the chip sequence being repetitively generated and coherently modulating each symbol of the data-symbol sequence with one period of the chip sequence, the improvement comprising:

at least one surface-acoustic-wave correlator phase matched to the chip sequence and responsive to the phase of the carrier signal modulated with the data-symbol sequence and chip sequence, for outputting a post-SAWC-signal pulse having the phase corresponding to the data-symbol sequence; and phase-detecting means responsive to the phase of the post-SAWC-signal pulse for generating the data symbol, wherein said phase-detecting generating means includes:

a phase-locked-loop device coupled to said surface-acoustic-wave-correlator device and responsive to the post-SAWC-signal pulse for locking phase and frequency of a PLL signal onto the post-SAWC-signal pulse; and means coupled to said phase-locked-loop device for comparing the phase of the PLL signal with the phase of the post-SAWC-signal pulse and generating the corresponding data symbol.

10. A phase coded spread spectrum SAWC system comprising:

data-sequence-generating means for generating a data-symbol sequence having at least two data symbols;

chip-sequence-generating means for repetitively generating at least one chip sequence;

carrier-modulating means for phase modulating a carrier signal with each chip of the chip sequence and each data-symbol of the data-symbol sequence, respectively;

at least one surface-acoustic-wave correlator phase matched to at least one chip sequence and responsive to the phase of the carrier signal for outputting a post-SAWC-signal pulse having the phase corresponding to the data symbol modulating the carrier signal; and phase-detecting means coupled to said surface-acoustic-wave correlator and responsive to the phase of the post-SAWC-signal pulse for generating the corresponding data symbol.

11. A SAWC receiver for use on a spread spectrum signal having a carrier signal phase modulated by a data-symbol sequence and by at least one chip sequence, with the chip sequence being repetitively generated and coherently modulating each symbol of the data-symbol sequence with one period of the chip sequence, the improvement comprising:

at least one surface-acoustic-wave correlator phase matched to at least one chip sequence and responsive to the phase of the carrier signal modulated with the data-symbol sequence and chip sequence, for outputting a post-SAWC-signal pulse having a phase corresponding to the data-symbol modulating the carrier signal; and phase-detecting means coupled ti said surface-acoustic-wave correlator and responsive to the phase of the post-SAWC-signal pulse for generating the corresponding data symbol, wherein said phase-detecting generating means includes:

means coupled to said surface-acoustic-wave-correlator device and responsive to comparing the phase of adjacent symbols of the carrier signal for generating the corresponding data symbol.

12. A SAWC receiver for use on a spread spectrum signal having a carrie signal phase modulated by a data-symbol sequence and by at least one chip sequence, with the chip sequence being repetitively generated and coherently modulating each symbol of the data-symbol sequence with one period of the chip sequence, the improvement comprising:

at least one surface-acoustic-wave correlator phase matched to at least one chip sequence and responsive to the phase of the carrier signal modulated with the data-symbol sequence and chip sequence, for outputting a post-SAWC-signal sequence and chip sequence, for outputting a post-SAWC-signal pulse having a phase corresponding to the data symbol modulating the carrier signal; and phase-detecting means coupled ti said surface-acoustic-wave correlator and responsive to the phase of the post-SAWC-signal pulse for generating the corresponding data symbol, wherein said phase-detecting generating means includes:

a phase-locked-loop device coupled to said surface-acoustic-wave-correlator device and responsive to the post-SAWC-signal pulse for locking phase and frequency of a PLL signal onto the post-SAWC-signal pulse; and means coupled to said phase-locked-loop device for comparing the phase of the PLL signal with the phase of the post-SAWC-signal pulse and generating the corresponding data symbol.

13. A method using a SAWC comprising the steps of:

generating a data-bit sequence having first data bits and second data bits;

repetitively generating a chip sequence;

modulating a carrier signal with the chip sequence in response to a first data bit;

phase shifting the chip sequence and modulating the carrier signal with a phase shifted chip sequence in responsive to a second data bit;

outputting from said SAWC a post-SAWC-signal pulse having a first phase or a second phase in response to the carrier signal being modulated with the chip sequence or the phase shifted chip sequence, respectively;

detecting the first or second phase of the post-SAWC-signal pulse;

generating the first data bit in response to detecting the first phase on the post-SAWC-signal pulse; and generating the second data bit in response to detecting the second phase on the post-SAWC-signal pulse.

14. A method using a phase coded spread spectrum SAWC receiver on a spread spectrum signal having a carrier signal phase modulated by a data-bit sequence and by a chip sequence, with the chip sequence being repetitively generated and each bit of the data-bit sequence modulated with one period of the chip sequence, the improvement comprising the steps of:

correlating with a surface-acoustic-wave-correlator device, the chip sequence and the carrier signal modulated with the data-bit sequence and chip sequence and outputting a post-SAWC-signal pulse having the phase modulated by the data-bit sequence; and generating the data-bit sequence from the phase of the post-SAWC-signal pulse, including the step of:

comparing the phase of adjacent bit times of the carrier signal for generating the data-bit sequence.

15. A method using a phase coded spread spectrum SAWC receiver on a spread spectrum signal having a carrier signal phase modulated by a data-bit sequence and by a chip sequence, what the chip sequence being repetitively generated and each bit of the data-bit sequence modulated with one period of the chip sequence, the improvement comprising the steps of:

correlating with a surface-acoustic-wave-correlator device, the chip sequence and the carrier signal modulated with the data-bit sequence and chip sequence and outputting a post-SAWC-signal pulse having the phase modulated by the data-bit sequence; and generating the data-bit sequence from the phase of the post-SAWC-signal pulse, including the steps of:

locking phase and frequency of a PLL signal with a phase-locked-loop device onto the post-SAWC-signal pulse; and comparing the phase of the PLL signal with the phase of the post-SAWC-signal pulse and generating the data-bit sequence.

16. A SAWC receiver for use on a spread spectrum signal having a carrier signal phase modulated by a data symbol sequence and by a plurality of chip sequence, with the chip sequences being repetitively generated and a pair of symbols of the data symbol sequence modulated with one period of one of the chip sequences and a phase shifted version of one of the chip sequences, repetitively, the improvement comprising:

a plurality of surface-acoustic-wave correlators with each surface-acoustic-wave correlator phase matched to a chip sequence of the plurality of chip sequences and responsive to the carrier signal phase modulated with a data symbol sequence and chip sequence, respectively, for outputting a post-SAWC-signal pulse; and phase-detecting means responsive to the post-SAWC-signal pulse for generating the data symbol sequence, wherein said phase-detecting means includes:

means coupled to said surface-acoustic-wave-correlator device and responsive to comparing phase of adjacent symbols of the carrier signal for generating the data symbol sequence.

17. A SAWC receiver for use on a spread spectrum signal having a carrier signal phase modulated by a data symbol sequence and by a plurality of chip sequences, with the chip sequences being repetitively generated and a pair of symbols of the data symbol sequence modulated with one period of one of the chip sequences and a phase shifted version of one of the chip sequences, respectively, the improvement comprising:

a plurality of surface-acoustic-wave correlators with each surface-acoustic-wave correlator phase matched to a chip sequence of the plurality of chip sequences and responsive to the carrier signal phase modulated with a data symbol sequence and chip sequence, respectively, for outputting a post-SAWC-signal pulse; and phase-detecting means responsive to the post-SAWC-signal pulse for generating the data symbol sequence, wherein said phase-detecting means includes:

a phase-locked-loop device coupled to said surface-acoustic-wave-correlator device and responsive to the post-SAWC-signal pulse for locking phase and frequency of a PLL signal onto the post-SAWC-signal pulse; and means coupled to said phase-locked-loop device for comparing phase of the PLL signal with the phase of the post-SAWC-signal pulse for generating the data symbol sequence.

18. A method using a SAWC receiver on a spread spectrum signal having a carrier signal phase modulated by a data symbol sequence and by at least two chip sequences, with the chip sequences being repetitively generated and a pair of symbols of the data symbol sequence modulated with one period of one of the chip sequences and a phase shifted version of one of the chip sequences, respectively, the improvement comprising the steps of:

correlating, with a surface-acoustic-wave correlator, at least one of the chip sequences and the carrier signal modulated with one of the data symbol sequences and a corresponding chip sequence;

outputting a post-SAWC-signal pulse from said surface-acoustic-wave-correlator device; and generating the data symbol sequence form the post-SAWC-signal pulse, further including the step of:

comparing the phase of adjacent symbols of the carrier signal for generating the data symbol sequence.

19. A method using a SAWC receiver on a spread spectrum signal having a carrier signal phase modulated by a data symbol sequence and by at least two chip sequences, with the chip sequences being repetitively generated and a pair of symbols of the data symbol sequence modulated with one period of one of the chip sequences and a phase shifted version of one of the chip sequences, respectively, the improvement comprising the steps of:

correlating, with a surface-acoustic-wave correlator, at least one of the chip sequences and the carrier signal modulated with one of the data symbol sequences and a corresponding chip sequence;

outputting a post-SAWC-signal pulse from said surface-acoustic-wave-correlator device; and generating the data symbol sequence from the post-SAWC-signal pulse, further including the step of:

locking phase and frequency of a PLL signal with a phase-locked-loop device onto the post-SAWC-signal pulse; and comparing the phase of the PLL signal with the phase of the post-SAWC-signal pulse and generating the data symbol sequence.

* * * * *